July 17, 1956  A. H. HAMBRECHT ET AL  2,754,928
GAS FILTER

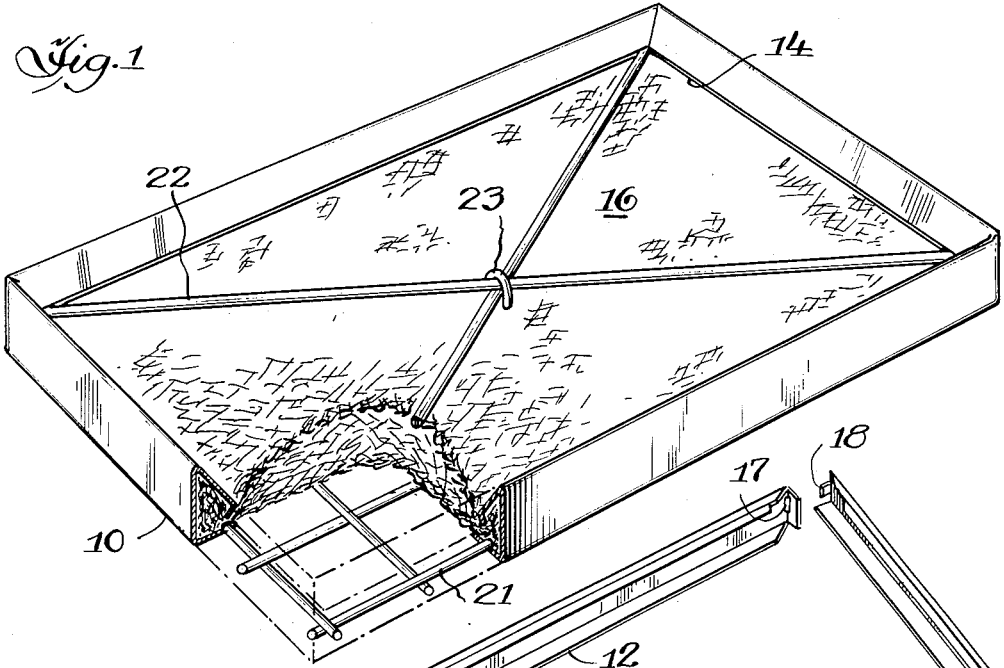
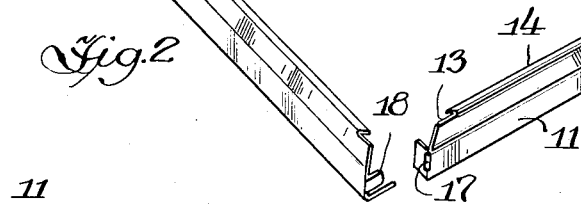
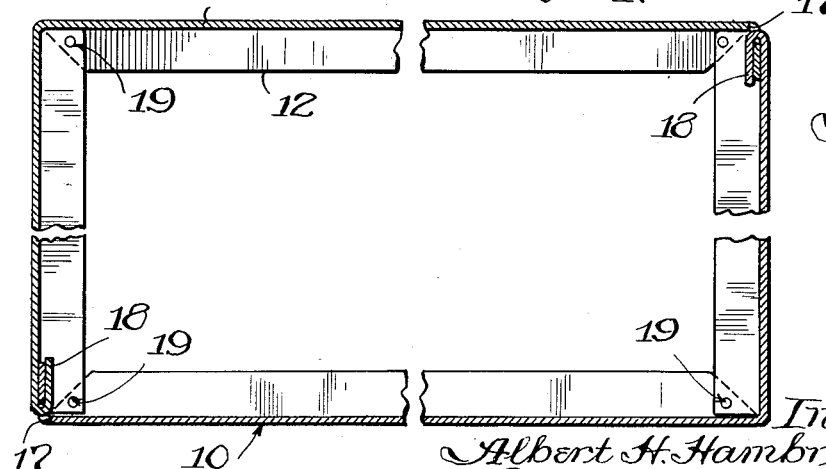

Filed Dec. 30, 1953  2 Sheets-Sheet 2

Inventors,
Albert H. Hambrecht
and Ragnar E. Onstad
By: Jones, Jesch & Darbo, Attys.

United States Patent Office 2,754,928
Patented July 17, 1956

2,754,928
GAS FILTER

Albert H. Hambrecht and Ragnar E. Onstad, Madison, Wis., assignors to Research Products Corporation, Madison, Wis., a corporation of Wisconsin Application December 30, 1953, Serial No. 401,226

6 Claims. (Cl. 183—49)

This invention relates to filters and more particularly to an improved construction for gas filters having an interstitial filtering element in the form of a pad and a supporting frame enclosing the edges of said pad. More particularly, the invention relates to a gas filter having an improved anchoring support frame accommodating and cooperating with an interstitial filter body having broad ingress and egress faces.

The principal object of the invention is to provide an improved gas filter wherein the supporting frame cooperates with the interstitial filter body to maintain said filter body firmly in position in such manner that it does not sag.

Another object is to provide a filter having an interstitial body and supporting frame which is simple and economical to manufacture.

Still another object of this invention is to provide a new and novel clamping support frame for use with an interstitial filter body.

Further objects and advantages will be apparent from the following description, which is to be taken in conjunction with the accompanying drawings in which Fig. 1 is a perspective view, partly broken away, of a completed filter which is an embodiment of the invention, showing the mode of cooperation between the elements thereof;

Fig. 2 is a perspective view showing two L-shaped frame sections prior to the assembly thereof into a frame of the character used in the filter of Fig. 1;

Fig. 3 is a sectional plan view of the frame showing the mode of its assemblage;

Figure 4:
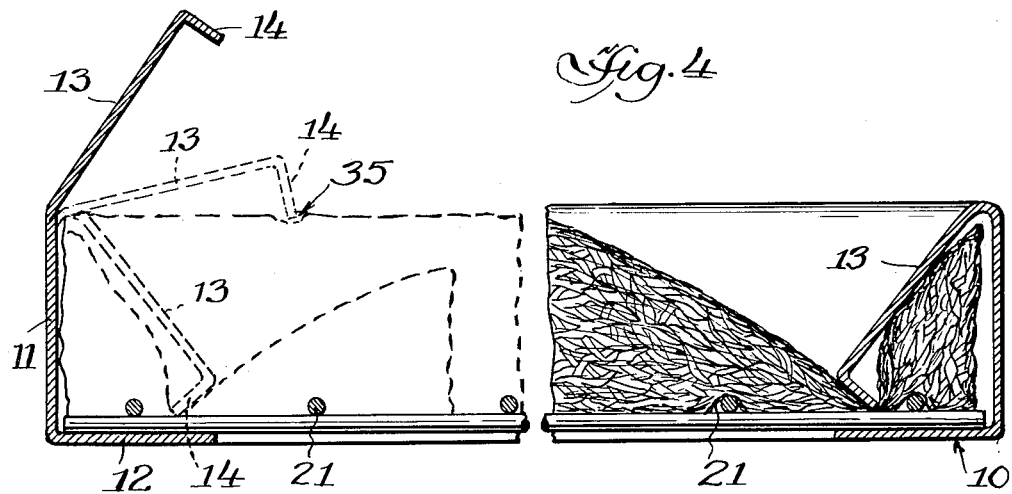
Fig. 4 is a sectional elevation of a partially completed filter showing the frame in its final form at the right and in the initial form before bending at the left; and showing the manner in which the filter body is placed under tensile stress and is anchored.

The embodiment described herein is comprised of an anchoring support frame and a flexible, interstitial filter body. Referring to Figs. 1 to 4, the support frame is made up of a channel-like member 10 which is composed of a stiff, malleable, sheet material such as aluminum, magnesium, synthetic resin or the like, which is shaped, as by rolling, to the desired initial form. Channel 10 has a base 11 and a pair of legs 12 and 13 which embrace the edge portions of the filter body in an advantageous manner as will be described. Leg 12, which for convenience will be called the bottom leg, projects in a direction substantially normal to the base 11, and the top leg 13 is initially at an obtuse angle, internally of channel 10, with respect to said base 11. Top leg 13 is later bent downwardly to an acute angle as will be described. In accordance with the present invention there is angularly disposed at the extremity of top leg 13 a flange 14 which extends downwardly in the direction of bottom leg 12.

Frame 10 is of such size and shape as will accommodate the filter body, and may be square, rectangular, triangular or polygonal in shape as desired. In the specific embodiment described, the filter body 16 is in the form of a flat rectangular pad. Frame 10 is rectangular and is fabricated of two L-shaped sections joined at the ends thereof. As shown in Fig. 2, flanges 14 are terminated a short distance from the ends of legs 13 to provide accommodation for the adjacent parts during the bending operation described hereinafter. The two L-shaped sections are joined together at the ends thereof by suitable means, as by slot 17 and tongue 18, or by welding, stapling or the like. As best seen in Fig. 3 bottom legs 12 are overlapped at the corners of the frame with the internal lap being cut normal to the edge of leg 12 and abutted against the adjacent inner surfaces of channel base 11. An abutment of the character described strengthens the frame and increases its rigidity. The overlapping portions of bottom legs 12 are joined as at point 19 by suitable means such as welding, stapling or the like, thereby increasing the rigidity of the frame.

The interstitial filter body 16 is arranged within the frame 10. Filter body 16 has broad ingress and egress faces and is comprised of a plurality of superposed layers of flexible, open-mesh sheet material in which the planes of the layers are parallel to said faces. The layers are composed of slit and expanded sheet material such as metal foil, paper or the like. A filter body composed of superposed expanded sheets is disclosed in Patent 2,070,073. The expanded sheets possess considerable tensile strength and are elastically stretchable in a plane parallel to the filter faces, and the filter body is elastically compressible in a direction transverse to said plane. Any other material which is unitary or coherent and possesses tensile strength in a direction parallel to the faces of the filter body is suitable, such as a body of superposed layers of open-mesh woven or knitted strands, or a body such as would be formed by a mass of filaments or fibers such as animal hair in which the individual filaments are coated with a cement such as rubber latex or the like in such a manner that the filaments are cemented together. The expanded sheet material is preferred because it is elastically stretchable and the filter body is in a very taut and firm condition. The thickness of body 16 is substantially equal to the width of frame base 11.

An open-mesh grid 21 of rods or wires is provided at the lower face of the filter body 16 and is supported by the bottom legs 12 of frame 10. The grid 21 provides support for the filter body 16 while it is in operation and while it is being cleaned. If desired, a reinforcement may be provided at the upper face of the filter body, a suitable means being a pair of rods or wires 22 which extend diagonally across the face of the body 16 and are held between the body and the top legs 13 of the frame at the corners of the latter, the notches at the ends of legs 13 provided by the removal of flanges 14 described heretofore providing accommodation for the rods 22. The rods are joined together where they cross and are joined to the grid 21 by the staple 23 which passes through the filter body 16. The front reinforcing members 22 may be desirable on the larger size filters but usually are unnecessary on the smaller filters.

Figure 5:
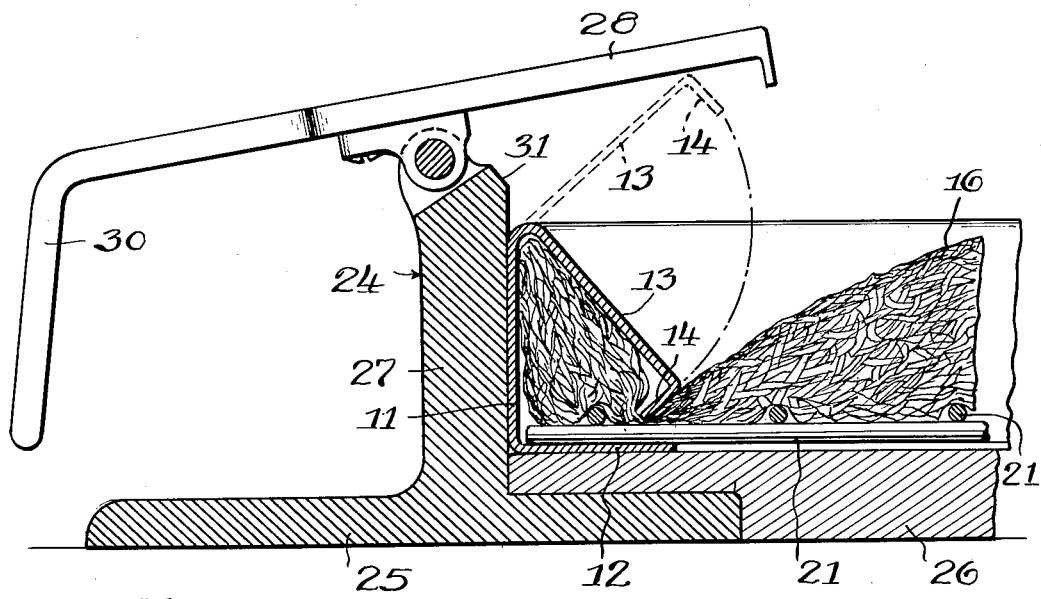
Fig. 5 is a sectional elevation of a means for bending the frame sections and with a frame section and filter body in position.

In assembling the filter, the two L-shaped sections of the frame 10 are arranged to encompass the edges of the grid 21 and the two sections are secured together, the top leg 13 being at this time in the upwardly extending position shown in Fig. 2 and in solid lines at the left in Fig. 4, that is, at an obtuse angle to the base 11. The ends of the rods or wires of the grid rest on the bottom legs 12 of the frame, and the filter body 16 is then placed in the frame by lateral insertion on top of the grid 21. The top reinforcing wires 22 are then placed on top of the filter body and are stapled together and to grid 21 by staple 23. Leg 13 is then bent downwardly into gripping relation with the body 16 to the position shown at the right in Fig. 4. Such bending may be done by hand but for convenience, speed and uniform bending throughout the length of each frame side, bending is preferably accomplished mechanically. A suitable mechanism for this purpose is shown in Fig. 5. Bending machine 24 is comprised of a base 25, cooperating base board 26, a vertical support 27, a bending plate 28 pivotally mounted upon support 27, and an actuating arm 30 suitably fastened to bending plate 28.

The frame 10 with body 16 enclosed therein is positioned within bender 24 with base 11 and bottom leg 12 resting against vertical support 27 and base board 26 respectively and with top leg 13 in the position shown in dotted lines in Fig. 5. Arm 30 is raised whereby plate 28 is lowered into contact with the outer end of top leg 13. The raising of arm 30 is continued and plate 28 then bends leg 13 downwardly about the line of juncture between base 11 and leg 13 until said leg 13 is angularly acute, internally of said channel 10 with respect to base 11, as shown in solid lines in Fig. 5. To insure that leg 13 will be turned downwardly to the desired final position, a shoulder 31 is provided for that purpose on upright element 27 and the plate 28 is turned downwardly until it engages said shoulder. This operation is carried out individually for each side of frame 10. However, if desired it can be performed simultaneously at all sides by suitable means.

As leg 13 is depressed, flange 14 makes contact with, bites into and grips the marginal portion of filter body 16 along a line spaced inwardly from the edge of the body as at the point 35 in Fig. 4. With the continued depressing of leg 13, the flange 14 exerts a substantial component of force acting on the body in a direction outwardly from the center toward the edges thereof. The depressing of leg 13 moves the gripping edges of flange 14 downwardly and outwardly and the flange moves with it the material of filter body 16. As this action is carried out at all of the sides of the frame, the filter body 16 is placed under tensile stress and is stretched into a firm and taut condition, and at the same time it is compressed between said gripping edges of the flanges 14 and the interior surface of the bottom legs 12 and is thereby fixed or anchored in said taut condition. At the locations of the members of grid 21 the body is locally compressed to a greater degree than elsewhere. The principal gripping action, however, is between flange 14 and bottom leg 12. As stated heretofore, the flange 14 is removed for a short distance at each end of the leg 13 to accommodate the wires 22 and when legs 13 are bent down they clamp the wires 22 firmly in position. The arrangement is such that in their final position the adjacent ends of legs 13 overlap a slight amount to insure clamping surfaces for wires 22.

In the specific embodiment which has been described, the flange 14 is substantially normal to leg 13. However, the included angle between said flange and leg may be varied from approximately 55 degrees to 125 degrees and any of the frame channels so formed provide satisfactory pad anchorage. An angle of approximately 90 degrees is preferred because it furnishes excellent filter body anchorage, permits economy of frame stock width and gives excellent finished filter appearance. Also, in the specific embodiment which has been described, the length of leg 13, i. e., the distance from its juncture with base 11 to flange 14, is approximately equal to the width of base 11, i. e., the distance between leg 12 and leg 13; and in the final position of leg 13 the angle between said leg and base 11 is in the neighborhood of 40 degrees. Such relationship is highly satisfactory since it provides a strong compression and gripping upon the body 16 and also a very substantial tensile stress and stretching of the material of body 16. If the leg 13 is shorter, or said angle is greater, the compression is less and the outward component of stress exerted upon the body 16 is also less.

It is to be understood, however, that the length of leg 13 and the size of said angle may be varied as desired to best suit the needs of the particular arrangement and composition of frame and filter body which are employed. For example, with a different filtering material or a thicker filter body, it may not be feasible to compress the body to the extent described in the foregoing, in which case a shorter leg 13 would be used, or said leg may be positioned at a greater angle with respect to base 11. The distance between the gripping edge of flange 14 and the cooperating surface of bottom leg 12 in the final position of top leg 13 is dependent on the thickness of the filter body 16 and the material of which the body is composed. For any given filter body the smaller the distance is, within limits of feasibility, the better will be the body anchorage.

Various forms and constructions of filter body 16 may be used in the filter of the invention as has been described in the foregoing. It is essential that such filter body possess substantial tensile strength in a direction parallel to its faces and be capable of withstanding tensile stress without rupture in order that the cooperating tautening and anchoring action of the frame be realized. It is an advantage that it be capable of undergoing substantial stretch without rupture, since such stretch produces increased tautness and firmness.

The filter arrangement of the invention provides the following desirable features. It provides a substantial component of force or stress acting in a direction from the filter body center outwardly toward the edges to pull and firmly tighten the filter body; secondly, it presents an edge of flange 14 which effectively grips the material of the filter body for the tautening, compressing and anchoring operation; and thirdly, it provides means in the nature of a toggle arrangement by which a pressure action occurs between the downwardly moving flange 14 (as it moves down to its final position) and the downwardly moving surface of the filter body (as the latter is being compressed), whereby the marginal portions of the filter body are compressed to the smallest thickness which is feasible between the edge of flange 14 and the interior surface of the bottom leg 12.

Such an arrangement provides many practical advantages. With the edge of flange 14 biting into and gripping the body 16 about the filter perimeter a better anchorage is provided between the legs flanging the ingress end egress faces. At the same time, the locking together of the parts around the periphery of the filter with the filter body under tension results in the binding of the frame and body together in a strong rigid unit. In addition, flange 14 stiffens frame members 10 lengthwise thereof, which is where stiffness is greatly needed, and thereby contributes to the strength and rigidity of the unit. The inwardly bent frame leg 13 serves to clamp the reinforcing grid 21 tightly in place and prevent dislodgment thereof, and does the same for the reinforcing wires 22 at the other face of the unit where such reinforcing is used. The joining together of the overlapped frame legs also adds strength and rigidity to the unit. The application of tensile stress to the filter body and the maintenance of said stress by the frame 10 keeps the filter body firm and taut and prevents objectionable sagging, and thereby results in improved performance and appearance. The added strength which the frame affords is especially valuable with large size filters in which rigidity and resistance to sagging are normally more difficult to accomplish. With the construction of the invention it is possible to make larger size filters than has been feasible heretofore without using much heavier frames. In fact, the present construction permits a reduction in the length of legs 12 and 13 from the usual width of frame flanges, with the result that a larger open face area of the filter is utilized in the filtering function. A filter of the character described is economical as to cost of material and also as to cost of manufacture, because the amount of material required for the frame is relatively small, and the fabrication of the parts and their assembly are relatively simple.

While but a single embodiment has been described and illustrated, this is by way of example and variations thereof will occur to those skilled in the art and are embraced within the present invention.

Invention is claimed as follow:

1. A gas filter comprising an interstitial filter body and a supporting frame therefor, said filter body having broad ingress and egress faces and relatively narrow edges and comprising a plurality of superposed layers of elastic, stretchable, expanded sheet material, said frame comprising an elongated channel member having a base and two legs enclosing the edge portions of said filter body and composed of a malleable sheet material, one of said legs being substantially normal to said base, the second of said legs having an elongated flange joined thereto along the extremity thereof remote from the junction thereof with said base and directed inwardly with respect to said channel substantially at right angles to said second leg, said second leg being bent along the line of juncture with said base to a position in which it is at an acute angle with respect to said base, said flange biting into the marginal portions of said body and providing a component of force acting in a direction outwardly from the center toward the edges of said body whereby said body is stretched and maintained in a taut condition by compressive anchorage between said flange and the interior surface of said first leg, and a reinforcing grid supported by said frame.

2. A gas filter including an interstitial filter body and a supporting frame therefor, said filter body having broad ingress and egress faces and relatively narrow edegs and possessing tensile strength in a direction parallel to said faces, said frame comprising an elongated channel member having a base and two legs enclosing the edge portions of said filter body and composed of a malleable sheet material, one of said legs being substantially normal to said base, the second of said legs having an elongated inwardly directed flange joined thereto along the extremity thereof remote from the junction thereof with said base, said second leg forming an acute angle with respect to the inner surface of said base, the edge portions of said filter body being compressed between said flange and the interior surface of said first leg, and said flange providing a component of force acting toward the edge of said body whereby said body is maintained in a taut condition.

3. A gas filter comprising an interstitial filter body having broad ingress and egress faces, a supporting frame comprising an elongated channel-like member having a base and two legs opening inwardly and embracing the edge portions of said filter body, the first of said legs projecting substantially normal to said base, the second leg having an elongated inwardly directed gripping flange along the extremity thereof remote from the junction thereof with said base, said flanged leg being disposed at an acute angle with respect to the interior surface of said base, said flange biting into the marginal portions of said body and compressing said body against said first leg.

4. A gas filter comprising an interstitial body having broad ingress and egress faces, a supporting frame comprising an inwardly opening channel member having a base and two legs enclosing the edge portions of said interstitial body, the first of said legs having a flange joined thereto along the extremity thereof remote from the junction thereof with said base, said flange extending inwardly from said first leg and terminating in an edge facing in a direction at an inclination with respect to said base and toward both said base and the second of said legs, said flange exerting compression upon said interstitial body.

5. An interstitial body having broad faces at two opposite sides thereof and relatively narrow edges, and a supporting channel-form frame having a base and two legs embracing the edge portions of said body, the first of said legs having a flange joined thereto along the extremity thereof remote from the junction thereof with said base, said flange extending in a direction at an inclination with respect to said base and toward both said base and the second of said legs, said interstitial body being held under compression between the legs of said channel.

6. In a filter embodying a compressible interstitial body having broad ingress and egress faces at opposite sides thereof respectively and having relatively narrow edges, a supporting integral channel-form frame member for said body having a base and two legs embracing an edge portion of said body, a first of said legs being bent toward the other of said legs at an inclination to said base, said first leg along its extremity remote from its junction with said base having a flange-like extension bent inwardly of said channel and engaging said body, said edge portion of said body being substantially reduced in thickness where engaged by said flange-like extension and being held under compression in said channel between said legs.

References Cited in the file of this patent

UNITED STATES PATENTS

| | | |
|---|---|---|
| 2,513,946 | Kliefoth | July 4, 1950 |
| 2,577,606 | Conley | Dec. 4, 1951 |
| 2,612,966 | Nicol | Oct. 7, 1952 |
| 2,675,887 | Gonzalez | Apr. 20, 1954 |

FOREIGN PATENTS

| | | |
|---|---|---|
| 575,641 | Great Britain | Feb. 27, 1946 |
| 714,196 | France | Sept. 1, 1931 |